(12) United States Patent
Krause et al.

(10) Patent No.: US 12,565,861 B1
(45) Date of Patent: Mar. 3, 2026

(54) APPARATUS AND METHOD TO CONTROL SUPPLYING FUEL TO A GAS TURBINE SYSTEM

(71) Applicant: Air Products and Chemicals, Inc., Allentown, PA (US)

(72) Inventors: Bryan Michael Krause, Whitehall, PA (US); Louis J. Katogir, Cherry Hill, NJ (US); Carl Alfred Dunn, Lenhartsville, PA (US); Zhong-Xiang Zhu, Macungie, PA (US); Erdem Arslan, Macungie, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 0 days.

(21) Appl. No.: 18/817,840

(22) Filed: Aug. 28, 2024

(51) Int. Cl.
| | |
|---|---|
| *F02C 9/28* | (2006.01) |
| *F02C 7/232* | (2006.01) |
| *F02C 9/40* | (2006.01) |
| *F02C 9/46* | (2006.01) |

(52) U.S. Cl.
CPC .............. *F02C 9/28* (2013.01); *F02C 7/232* (2013.01); *F02C 9/40* (2013.01); *F02C 9/46* (2013.01)

(58) Field of Classification Search
CPC .... F02C 7/22; F02C 7/232; F02C 9/26; F02C 9/28; F02C 9/40; F02C 9/46; F23R 3/36; B64D 37/32; F23N 2237/08
See application file for complete search history.

(56) References Cited

U.S. PATENT DOCUMENTS

| | | | | |
|---|---|---|---|---|
| 5,816,792 A | * | 10/1998 | Spencer | F23N 1/005 |
| | | | | 431/90 |
| 8,151,740 B2 | * | 4/2012 | Loeven, II | F23N 1/002 |
| | | | | 431/12 |
| 8,833,052 B2 | * | 9/2014 | Loeven, II | F02C 9/44 |
| | | | | 60/39.463 |
| 9,146,566 B2 | * | 9/2015 | Swann | G05D 11/132 |
| 10,100,748 B2 | * | 10/2018 | Kawai | F02C 9/40 |
| 11,624,326 B2 | * | 4/2023 | Yeung | F02C 7/232 |
| | | | | 166/250.15 |
| 11,867,118 B2 | * | 1/2024 | Yeung | F02C 7/236 |

(Continued)

FOREIGN PATENT DOCUMENTS

| | | |
|---|---|---|
| CN | 116537951 A | 8/2023 |
| WO | 2015062966 A1 | 5/2015 |
| WO | 2025034379 A1 | 2/2025 |

*Primary Examiner* — Alain Chau
(74) *Attorney, Agent, or Firm* — DaLesia H. Boyd; Jason M. Ploeger

(57) ABSTRACT

An apparatus, system, and method to control the supplying of fuel to a gas turbine system can be configured to help avoid a flame out condition in which combustion of fuel in the turbine ceases in operation when transitioning from one fuel to another quickly due to dissimilar combustion characteristics. Embodiments can include detecting a sudden loss of a supply of fuel and, in response to such a detection, adjusting at least one control parameter to control adjustment of fuel being provided from one or more other sources to account for the lost fuel source. After a transient time period of fuel switching has past, the control parameter adjustment can be removed so the control parameter(s) are returned to other values associated with normal operation.

15 Claims, 4 Drawing Sheets

(56)     References Cited

U.S. PATENT DOCUMENTS

| | | | | |
|---|---|---|---|---|
| 12,098,684 | B2 * | 9/2024 | Swann | F02C 3/20 |
| 12,180,899 | B2 * | 12/2024 | Swann | F02C 3/20 |
| 12,215,637 | B2 * | 2/2025 | Suleiman | F02C 9/40 |
| 2005/0050897 | A1 * | 3/2005 | Lewis | F02C 9/263 |
| | | | | 60/764 |
| 2008/0196385 | A1 | 8/2008 | Rebhan et al. | |
| 2010/0162678 | A1 | 7/2010 | Annigeri et al. | |
| 2010/0304316 | A1 * | 12/2010 | Codron | F23K 5/002 |
| | | | | 60/39.463 |
| 2012/0079831 | A1 | 4/2012 | Kirzhner et al. | |
| 2013/0340324 | A1 * | 12/2013 | Swann | F02C 3/30 |
| | | | | 585/14 |
| 2015/0134151 | A1 * | 5/2015 | Swann | F02C 3/20 |
| | | | | 701/3 |
| 2016/0076461 | A1 * | 3/2016 | Kawai | B64D 37/30 |
| | | | | 60/39.463 |
| 2016/0146117 | A1 * | 5/2016 | Swann | F02C 9/46 |
| | | | | 60/39.19 |
| 2021/0095601 | A1 * | 4/2021 | Yeung | F02C 7/232 |
| 2023/0212992 | A1 * | 7/2023 | Yeung | F02C 7/232 |
| | | | | 60/39.281 |
| 2023/0323824 | A1 * | 10/2023 | Swann | F02C 9/40 |
| | | | | 60/39.094 |
| 2023/0340915 | A1 * | 10/2023 | Speak | B64D 27/10 |
| 2024/0084743 | A1 * | 3/2024 | Suleiman | F02C 3/30 |
| 2024/0240594 | A1 * | 7/2024 | Asao | F02C 7/22 |

* cited by examiner

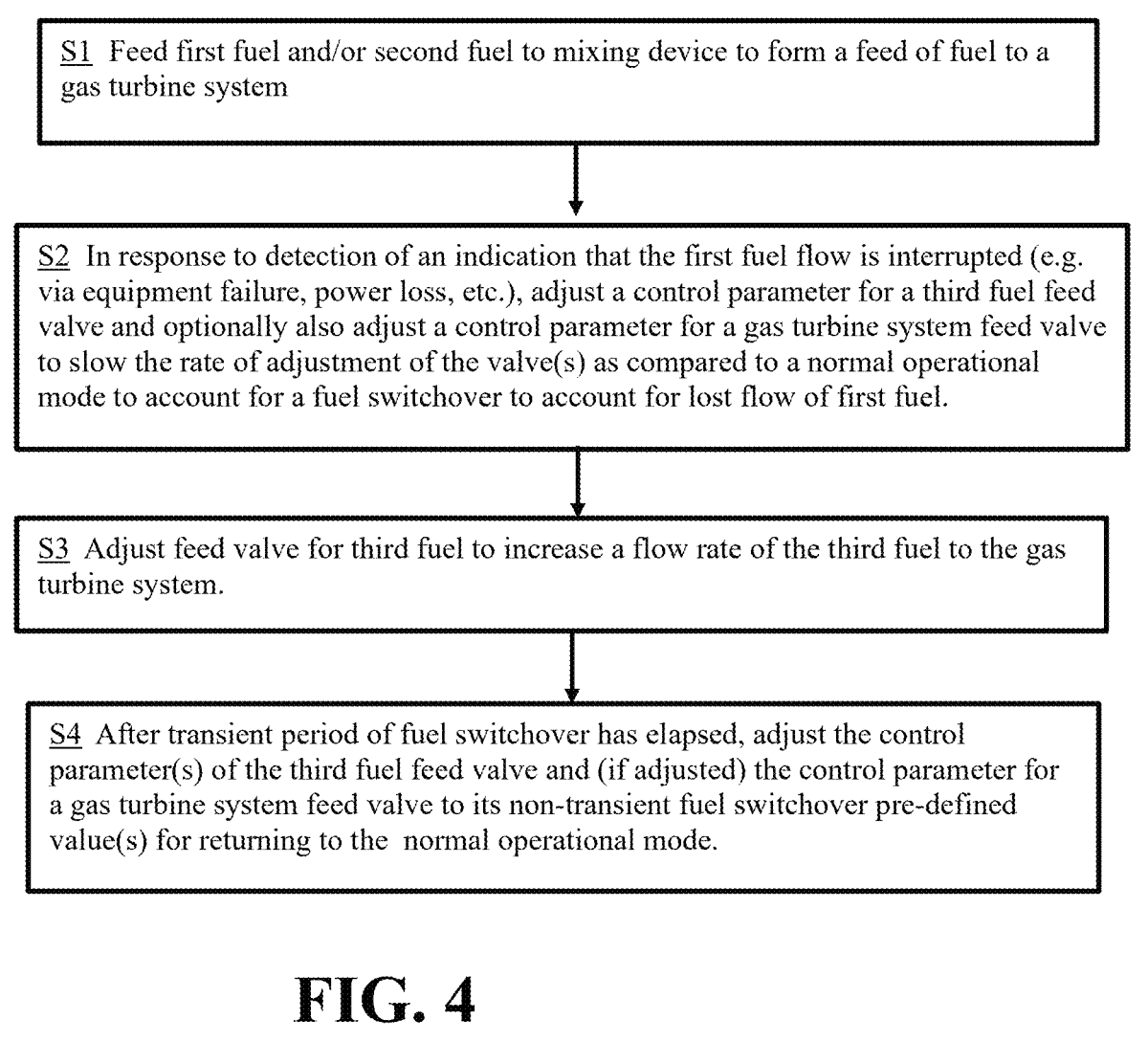

S1  Feed first fuel and/or second fuel to mixing device to form a feed of fuel to a gas turbine system S2  In response to detection of an indication that the first fuel flow is interrupted (e.g. via equipment failure, power loss, etc.), adjust a control parameter for a third fuel feed valve and optionally also adjust a control parameter for a gas turbine system feed valve to slow the rate of adjustment of the valve(s) as compared to a normal operational mode to account for a fuel switchover to account for lost flow of first fuel.

S3  Adjust feed valve for third fuel to increase a flow rate of the third fuel to the gas turbine system.

S4  After transient period of fuel switchover has elapsed, adjust the control parameter(s) of the third fuel feed valve and (if adjusted) the control parameter for a gas turbine system feed valve to its non-transient fuel switchover pre-defined value(s) for returning to the  normal operational mode.

FIG. 4

APPARATUS AND METHOD TO CONTROL SUPPLYING FUEL TO A GAS TURBINE SYSTEM

FIELD OF THE INVENTION

The present innovation relates to methods, systems, and apparatuses to control the supplying of fuel to a gas turbine system.

BACKGROUND OF THE INVENTION

Gas turbines may be provided for generation of electrical power. Examples of gas turbines and their operation are disclosed in International Publication No. WO 2015/062966 and U.S. Patent Application Publication Nos. 2010/0162678 and 2008/0196385.

SUMMARY OF THE INVENTION

Gas turbines typically are designed to operate on a variety of fuels, but when they are required to operate on pure hydrogen or natural gas fuel, there can be a prominent issue of "flame out" wherein combustion in the turbine ceases in operation when transitioning from one fuel to another quickly due to dissimilar combustion characteristics. For example, the transition from a pure hydrogen fuel to a natural gas fuel or vice versa can represent a worst case scenario due to the dissimilar combustion characteristics of these fuels. However, this issue can also exist with transition from a first fuel to another fuel (e.g. a transition from hydrogen to a refinery off-gas, a transition from natural gas to a refinery off-gas, etc.).

This type of fuel transition related issue can significantly affect continuous gas turbine operation when one of or more of multiple fuel type sources is adversely affected by rapid transitions from one fuel source type to another, especially with fuel sources with dissimilar combustion characteristics. While addressing this fuel type transition during normal operations may face less challenges as the rate of change from one fuel source to another fuel source may be controlled when it is anticipated and planned for, unexpected transient upset scenarios where one fuel source type is unexpectedly lost and another fuel type needs to be fed to the gas turbine system quickly to maintain operation can pose a significant problem that can result in "flame out" condition in which combustion operation is lost. Other issues, such as fluctuating shaft power outputs, widely varying exhaust temperatures and fuel supply pressure decay below gas turbine operating limits can also occur due to such unexpected transient operational issues that may arise form unexpected loss of a fuel source.

A fuel supply system can be configured to help transition between different fuel types in a controlled manner that can be configured to keep the gas turbine operational (e.g. avoid flame out conditions). Embodiments can provide a significant improvement in operation, especially during transient upsets when a fuel source is lost (e.g., due to an equipment failure, due to a supply of hydrogen being provided via a renewable process being lost due to weather conditions or other issue, etc.).

In some embodiments, a fuel supply system can be provided that can be configured to utilize a cascaded pressure control, flow measurement of each fuel stream, composition monitoring of varying fuel sources, and a fuel gas conduit design with sufficient volume that can allow for the fuel composition to transition within limits of a gas turbine combustor design. In some embodiments, the fuel gas conduit design can utilize a mixing tee, a mixing drum, or other type of mixing device to provide a mixture of one or more fuels to the gas turbine system. Embodiments can also be configured to account for a sudden and unexpected change in fuel supplies that may result in a rapid change in a Wobbe index and/or heat of combustion for the fuel being supplied to the gas turbine for combustion of the fuel. Some embodiments can be configured to avoid such rapid changes so that a change that may occur is kept at or under a pre-selected rate of change (e.g., a change of no more than 1% per second in Wobbe index and/or a change of no more than 1% per second in the heat of combustion).

For example, in some embodiments, a control system can be provided that can detect an unexpected and sudden loss of fuel from a source of fuel. In response to such a detection, control parameters for at least one valve of the fuel supply system can be adjusted to slow the rate of speed at which another fuel may be provided to the gas turbine system in response to the unexpected loss of fuel. This adjustment in one or more control parameters may be configured to last for a pre-defined or pre-selected transient time period so that the switchover from the lost fuel source to a new fuel source in providing of the fuel to the gas turbine system is able to account for the lost fuel, gas turbine combustion needs for maintaining the flame(s) formed via combustion of the fuel (e.g. avoid flame instabilities, etc.), and a pre-selected set of pollution control criteria that may be applicable to combustion of the fuel for operation of the gas turbine (e.g. nitrous oxide, NOx, emissions, carbon monoxide, CO, emissions, etc.). Embodiments disclosed herein can be configured to facilitate a transition between different fuel sources that have dissimilar combustion characteristics while maintaining fuel supply pressure within limits of a gas turbine's combustion system design during a transient upset scenario.

Some embodiments can utilize pressure controllers that can be configured to provide a cascading pressure control scheme, a flowmeter for each fuel source, and a gas chromatograph to determine constituents of any fuel source that has a varying composition. Embodiments can also utilize a conduit arrangement (e.g. piping, valves, a mixing device such as, for example, a mixing tee, mixing drum, etc., and other conduit elements) that can provide fuel mixing and convey the mixed fuel to a gas turbine system.

In some embodiments, pressure controllers can be located both upstream of the flow meter, and downstream of the flow control valve for each fuel type source. Each fuel source can be introduced into a fuel manifold via a mixing tee or other mixing device to help ensure proper mixing of different fuel source types and limit the transition speed of fuel source types to be gradual enough where the gas turbine combustion system can properly operate through the fuel type transition without flame out or other set of pre-selected significant unwanted performance issues.

Embodiments can be configured so that each fuel source can be introduced in a cascading manner based on pressure. The primary fuel source in such embodiments can be identified as the fuel source in the process that is most preferentially desired to be consumed in operation of the gas turbine and can be set for providing to the gas turbine system at a highest pressure that is within turbine operational limits. A secondary fuel source can function as backup in the event the primary fuel source is lost, while being lined up to feed the fuel system immediately, but at a lower pressure than the primary fuel source. Subsequent fuel sources (e.g. a third fuel source, a fourth fuel source, etc.) can be provided at lower pressures (e.g. a third pressure that is lower than the second pressure of the secondary fuel source) can also be provided to provide fuel at a lower pressure than the more preferred fuel sources, but still within the pressure range for fuel pressure that the gas turbine can utilize for operation. Embodiments can be configured so that gas turbine operation (e.g. combustion of the fuel for generation of power) can remain uninterrupted even when the primary fuel source and/or secondary fuel source are immediately and unexpectedly unavailable.

For instance, in some embodiments the fuel supply conduit arrangement can be configured so that there is sufficient volume of fuel to promote mixing and blending of the less preferred fuel during a fuel supply interruption so sufficient fuel can be supplied to the gas turbine system before it gets to the battery limits of the gas turbine system. This configuration of the fuel supply conduit arrangement can provide sufficient volume for the flow of less preferred fuel to help avoid acute pressure decay by allowing the less preferred backup fuel source some time to blend into the gas turbine system while still maintaining minimum operating pressure for the gas turbine system.

As noted above, embodiments can be configured so that each fuel line source can be equipped with its own flow meter transmitter. The specific flowmeter that is used can be selected based on the gas composition of the fuel source. In some embodiments, flow measurement data from the flow meters can be sent to the gas turbine control system as a feed forward measure to help ensure proper combustion through a detected transient upset condition until the fuel system stabilizes after the switching of fuel sources. The providing of such data and updating of the gas turbine control system to account for the transient issue and transition to a less preferred fuel source can help the fuel supply system adjust quickly enough to maintain operation of the gas turbine system through the transient upset condition and switchover of fuel source(s) that may be necessitated by an unexpected problem or issue. A gas chromatograph sensor can be added to the system for each of the fuel sources that may have a varying composition to help better control emissions (e.g. so the gas turbine combustion system can be provided with correct information for turbine heat input of combustion of the fuel for operation of the gas turbine and combustion of the fuel while the fuel is switched to the less preferred fuel source(s)).

Embodiments can be configured to implement a control strategy to tune the control system for the providing of fuel to a gas turbine system that can account for fuel availability and the heat of combustion control on the gas turbine side simultaneously. In some embodiments, a nonlinear control strategy via gain scheduling can be implemented to achieve fuel transition control. Further, conventional process design and control systems may prevent a fuel transition control system from acting fast enough for a fuel supply line (e.g. a natural gas supply line) to sufficiently make up the loss of flow in a more preferred fuel supply line (e.g. a hydrogen fuel supply line) during transition. Consequently, this can lead to a significant drop in the heat of combustion and create operational problems in the downstream gas turbine generators of a gas turbine system. One surprising result of the present disclosure is that detection of a transient condition issue and an adjustment in certain control parameter elements (e.g., adjustment in responsiveness to gain used for adjustment in valve positioning, etc.) that may occur in response to such a detection can be provided to avoid such operational problems and provide improved fuel delivery to a gas turbine system during fuel transitions.

For example, according to the present disclosure there can be strong and nonlinear interactions among control loops as well as significant nonlinear behavior during severe changes (e.g., tripping of one or more compressors that may supply a first fuel to the gas turbine system, etc.). For instance, at the initial stage of a trip or other transient issue that may result in a sudden and unexpected loss of fuel form a source of fuel, the fuel transition control and the heat of combustion control for the gas turbine system can both react in a similar way, which can result in excessively aggressive control actions which tend to yield instability and severe oscillatory behavior. At a later stage of such a transient condition (e.g. after an initial instance of the lost fuel has passed), the different control loops can react in opposite directions that can result in subdued and sluggish control actions that can result in a long setting time to return a turbine system to a steady state condition after transition to another fuel as a response to reacting to the transient condition. Embodiment of our process and control system can facilitate use of a control scheme that can provide an improved fuel transition control that can react to such transient issues.

In some embodiments, at the time of a transient condition is detected (e.g. sudden loss of fuel from a source of fuel due to a trip of equipment or an equipment failure, etc.), different controllers of different fuel sources can be detuned in a way that results in the controllers control parameters adjustment being set to slow their responsiveness to the change as compared to when operating in a pre-defined normal mode. Controllers on the fuel supply side or controller on both the fuel supply (fuel transition controls) and the gas turbine system (e.g. heat of combustion control) can be detuned in a way that the gains of all the controllers are reduced to slow their responsiveness to the detected changer for an initial time period or stage of the transition of fuels that may occur as a result of a transient issue (e.g. the gains of the controllers can be set to 50% of the normal values for nominal controls at their design conditions/normal operational conditions). At a later stage in the transition process, the controllers can be re-adjusted back to their normal operational settings (e.g. the gains of all the controllers can be set back to their perspective nominal values.

According to the present disclosure, an initial response to a detected transient issue in reducing the responsiveness of the controllers via control parameter adjustment settings can help provide a weakened overall control action, consequently leading to another surprising result of mitigating and/or eliminating instability and/or oscillations at, adjacent to, or within a gas turbine system being provided with fuel. Moreover, the subsequent re-adjustment of the control parameter adjustment settings after the initial stage of the response to the transient condition can help provide a stronger control action to overcome the sluggish responsiveness that can be experienced in conventional approaches. Yet another surprising result of the present disclosure is this type of staged control parameter adjustment approach can provide improved fuel supply performance for supporting gas turbine system operation that can help avoid flame instability, oscillation, and/or flame out conditions.

In a first aspect, a method or process to control supplying of fuel to a gas turbine system is provided. Embodiments of the method or process can include feeding fuel to a gas turbine system that includes a first fuel for a pre-defined normal operation of the gas turbine system. The first fuel can be passable from a source of the first fuel to a mixing device via a first fuel conduit for being fed to the gas turbine system. The fuel can be fed to the gas turbine system for the pre-defined normal operation of the gas turbine system including only the first fuel or a combination of the first fuel and a second fuel that is also fed to the mixing device for being fed to the gas turbine system. The method or process can also include detecting a transient condition that results in a flow of the first fuel ceasing or being supplied at a flow rate below a minimum flow rate needed for operation of the gas turbine system. In response to detecting the transient condition, a control parameter for a feed valve of a third fuel conduit that connects a source of a third fuel to the mixing device for feeding the third fuel to the gas turbine system can be adjusted so that a rate of adjustment of a position of the feed valve of the third fuel conduit is reduced for a transient condition time period. The feed valve of the third fuel conduit can be controlled to feed the third fuel from the source of the third fuel to the gas turbine system based on the adjusted control parameter for the feed valve of the third fuel conduit to supply the third fuel to the gas turbine system to account for the loss of the first fuel that resulted in the detected transient condition so that the gas turbine system combusts the third fuel and avoids a flame out condition.

In some embodiments, a transient condition can be due to an equipment failure that results in an unexpected and sudden loss of fuel. The transient condition may also occur as a result of a trip condition in equipment that may result in a loss of fuel. In some embodiments, a transient condition can include an equipment failure, equipment malfunction, a tripped condition of equipment (e.g. at least one compressor) or other problem that may arise and prevent a source of fuel from being available for feeding to the gas turbine system.

In a second aspect, the method or process can also include detecting an end to the transient condition time period based on operation of the gas turbine system and the feeding of the third fuel to the gas turbine system. In response to detecting the end of the transient condition time period, the control parameter for the feed valve of the third fuel conduit can be adjusted to adjust it to a normal operational mode setting so that the rate of adjustment of the position of the feed valve of the third fuel conduit is increased to a pre-selected value for a pre-defined normal operation.

In a third aspect, the method or process can include adjusting a control parameter for a feed valve of a gas turbine system feed conduit that is connected between the gas turbine system and the mixing device for feeding the fuel from the mixing device to the gas turbine system in response to detecting the transient condition. The adjustment of the control parameter for the feed valve of the gas turbine system feed conduit can be performed such that a rate of adjustment of a position of the feed valve of the gas turbine system feed conduit is reduced for the transient condition time period. The method or process can also include controlling the feed valve of the gas turbine system feed conduit to feed the fuel that includes the third fuel output from the mixing device to the gas turbine system based on the adjusted control parameter for the feed valve of the gas turbine system feed conduit to supply the third fuel to the gas turbine system to account for the loss of the first fuel that resulted in the detected transient condition so that the gas turbine system combusts the third fuel and avoids a flame out condition.

In some embodiments, a controller of the gas turbine system can also adjust operation of the gas turbine system in response to detection of the transient condition.

In a fourth aspect, the method or process can include adjusting operation of the gas turbine system in response to detection of the transient condition. In some embodiments, a controller of the gas turbine system can perform at least some of the adjusting of the operation of the gas turbine system.

In a fifth aspect, the first fuel can include hydrogen and the third fuel can include natural gas. A pressure of the source of the first fuel can be greater than a pressure of the source of the third fuel. In some embodiments, the second fuel can include a refinery off-gas. In other embodiments, it is contemplated that the first, second, and/or third fuel can be other types of fuel.

In a sixth aspect, the method or process can include initiating feeding of the third fuel to the mixing device after a pressure has reduced to a pressure at the mixing device that is below a pressure of the source of the third fuel. The initiation of the feeding of the third fuel can occur after detecting the transient condition.

In a seventh aspect, the control parameter for a feed valve of a third fuel conduit is a gain value for a controller of the feed valve of the third fuel conduit. For example, in some embodiments adjusting of the control parameter for the feed valve of the third fuel conduit can be a reduction of the gain value of between a 25% reduction and a 75% reduction.

In an eighth aspect, the method or process can include operating the gas turbine system for combustion of the third fuel during the transient condition time period to avoid a flame out condition and avoid oscillation.

In a ninth aspect, the detecting of the transient condition can include determining a loss of flow of the first fuel that exceeds a pre-selected transient condition threshold based on data from a flow sensor of a first fuel conduit and/or a pressure sensor of the first fuel conduit. In some embodiments, such a detected condition can be a result of the transient condition being a trip of a compressor of the source of the first fuel that prevents the first fuel from being feedable to the gas turbine system. As another example, such a transient condition can be due to an equipment failure that prevents the first fuel from being feedable to the gas turbine system.

In a tenth aspect, the method or process of the first aspect can include one or more features of the second aspect, third aspect, fourth aspect, fifth aspect, sixth aspect, seventh aspect, eighth aspect and/or ninth aspect. The method or process can also include other features or method or process steps. Examples of other features or method or process steps can be appreciated from the exemplary embodiments of the method or process disclosed herein, for instance. The process can also include utilization oof an apparatus for supplying fuel to a gas turbine system.

In an eleventh aspect, an apparatus for supplying fuel to a gas turbine system is provided. The apparatus can include a first fuel conduit that is positioned between a source of a first fuel and a mixing device. The first fuel conduit can have a first fuel feed valve, a first pressure sensor upstream of the first fuel feed valve, a second pressure sensor downstream of the first fuel feed valve, and a flow sensor that are communicatively connected to a first controller. The first controller can be configured to control adjustment of the first fuel feed valve based on data from the flow sensor, the first pressure sensor, and the second pressure sensor of the first fuel conduit.

The apparatus can also include a second fuel conduit that is positioned between a source of a second fuel and the mixing device. The second fuel conduit can have a second fuel feed valve, a first pressure sensor upstream of the second fuel feed valve, a second pressure sensor downstream of the second fuel feed valve, a fuel composition sensor, and a flow sensor that are communicatively connected to a second controller. The second controller can be configured to control adjustment of the second fuel feed valve based on data from the flow sensor, the fuel composition sensor, the first pressure sensor, and the second pressure sensor of the second fuel conduit.

The apparatus can also include a third fuel conduit that is positioned between a source of a third fuel and the mixing device. The third fuel conduit can have a third fuel feed valve, a first pressure sensor upstream of the third fuel feed valve, a second pressure sensor downstream of the third fuel feed valve, and a flow sensor that are communicatively connected to a third controller. The third controller can be configured to control adjustment of the third fuel feed valve based on data from the flow sensor, the first pressure sensor, and the second pressure sensor of the third fuel conduit.

The apparatus can also include the mixing device. The mixing device can be positioned between a gas turbine system and the first fuel source, the second fuel source, and the third fuel source so that fuel received via the first fuel conduit, second fuel conduit and/or third fuel conduit is feedable to a gas turbine system feed conduit to supply the gas turbine system with the fuel.

A pressure of the source of the first fuel can be greater than a pressure of the source of the third fuel and a pressure of the source of the second fuel can be greater than the pressure of the source of the third fuel.

In some embodiments, the first fuel can be hydrogen or include hydrogen, the second fuel can include a refinery off-gas or be a refinery off-gas and the third fuel can include natural gas or be natural gas.

The first controller, second controller and third controller can each by a type of computer device. Each controller can include hardware that includes a processor connected to a non-transitory computer readable medium and at least one transceiver unit, for example.

In some embodiments, the transient condition is due to an equipment failure that prevents the first fuel from being feedable to the gas turbine system. The transient condition can also be due to a tripped condition of equipment or can be an equipment failure or other problem that may result in an unexpected loss of a supply of the first fuel.

In a twelfth aspect, the third controller can be configured to detect a transient condition that results in a flow of the first fuel ceasing or being supplied at a flow rate below a minimum flow rate needed for operation of the gas turbine system. The third controller can also be configured so that in response to detecting the transient condition, a control parameter for the feed valve of the third fuel conduit is adjusted so that a rate of adjustment of a position of the feed valve of the third fuel conduit is reduced for a transient condition time period and the feed valve of the third fuel conduit is controlled to feed the third fuel from the source of the third fuel to the gas turbine system based on the adjusted control parameter for the feed valve of the third fuel conduit to supply the third fuel to the gas turbine system to account for the loss of the first fuel that resulted in the detected transient condition so that the gas turbine system combusts the third fuel and avoids a flame out condition.

In some embodiments, the third controller can also be configured to detect an end to the transient condition time period based on operation of the gas turbine system and feeding of the third fuel to the gas turbine system. The third controller can be also configured so that in response to detecting the end of the transient condition time period, the control parameter for the feed valve of the third fuel conduit is adjusted to a normal operational mode setting so that the rate of adjustment of the position of the feed valve of the third fuel conduit is increased to a pre-selected value for a pre-defined normal operation.

In a thirteenth aspect, the apparatus can also include a controller of a feed valve of the gas turbine system feed conduit that is configured so that in response to detecting the transient condition, a control parameter for the feed valve of the gas turbine system feed conduit is adjusted so that a rate of adjustment of a position of the feed valve of the gas turbine system feed conduit is reduced for the transient condition time period for controlling the feed valve of the gas turbine system feed conduit to feed the fuel that includes the third fuel outputtable from the mixing device to the gas turbine system based on the adjusted control parameter for the feed valve of the gas turbine system feed conduit to supply the third fuel to the gas turbine system to account for the loss of the first fuel that resulted in the detected transient condition so that the gas turbine system combusts the third fuel and avoids a flame out condition.

In a fourteenth aspect, the apparatus of the eleventh aspect can include other features or elements. For example, the apparatus of the eleventh aspect can include one or more features of the twelfth aspect and/or thirteenth aspect. The apparatus can also include other features. Examples of other features can be appreciated from the exemplary embodiments of the apparatus discussed herein, for instance.

In a fifteenth aspect, a control system for an apparatus for supplying fuel to a gas turbine system is provided. The control system can include a controller having a processor connected to a non-transitory computer readable medium. The controller can be positioned to control a fuel valve of a fuel conduit connected between a source of fuel and a mixing device for feeding the fuel to a gas turbine system. The controller can be configured to detect a transient condition that results in a flow of another fuel ceasing or being supplied at a flow rate below a minimum flow rate needed for operation of the gas turbine system and, in response to detecting the transient condition, adjusting a control parameter for the feed valve of the fuel conduit so that a rate of adjustment of a position of the feed valve is reduced for a transient condition time period. The controller can be configured to control the feed valve based on the adjusted control parameter to supply the fuel to the gas turbine system to account for the loss of the other fuel that resulted in the detected transient condition so that the gas turbine system avoids a flame out condition.

In some embodiments, the configuration of the controller can be from code stored on the computer readable medium of the controller that can be processed by the processor. The configuration can also be due to the controller receiving data from one or more sensors to which the controller can be communicatively connected for evaluation of that data in accordance a pre-defined evaluation scheme defined by code stored in the non-transitory computer readable medium that can be run by the processor. The controller can also include other hardware elements for configuration of the controller.

Embodiments of the control system can also include other features or elements. In some embodiments, the control system can include a first controller, second controller and third controller, for example. The control system can also include a controller of a controller of a feed valve of the gas turbine system feed conduit.

Embodiments of the control system can also include other elements. For example, pressure sensors, compositional sensors, temperature sensors, or other types of sensor or detectors can be included in the control system. As another example, other types of automated process control elements can be included in embodiments of the control system.

Other details, objectives, and advantages of an apparatus to control the supplying of fuel to a gas turbine system, a system to control the supplying of fuel to a gas turbine system, a method or process to control the supplying of fuel to a gas turbine system, and methods of making and using the same will become apparent as the following description of certain exemplary embodiments thereof proceeds.

BRIEF DESCRIPTION OF THE DRAWINGS

Exemplary embodiments of our apparatus to control the supplying of fuel to a gas turbine system, a system to control the supplying of fuel to a gas turbine system, a method or process to control the supplying of fuel to a gas turbine system, and methods of making and using the same are shown in the drawings included herewith. It should be understood that like reference characters used in the drawings may identify like components.

FIG. 4 is a flow chart illustrating a first exemplary embodiment of a method or process to control the supplying of fuel to a gas turbine system. The first exemplary embodiment of an apparatus 1 to control the supplying of fuel to a gas turbine system and the first exemplary embodiment of the system to control the supplying of fuel to a gas turbine system can each be configured to implement an embodiment of this method or process.

DETAILED DESCRIPTION

Figure 1:
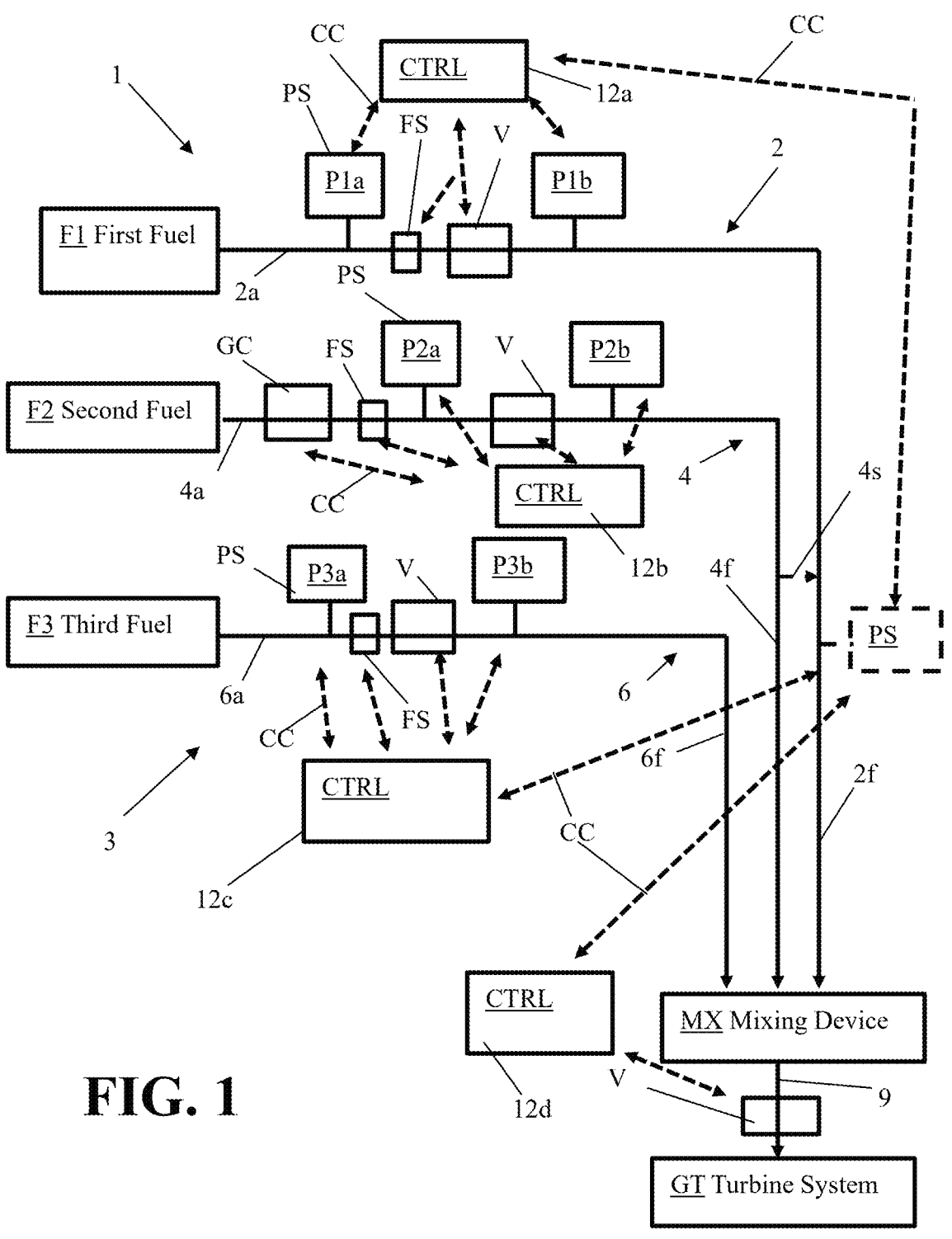
FIG. 1 is a block diagram of a first exemplary embodiment of an apparatus 1 to control the supplying of fuel to a gas turbine system. An embodiment of the apparatus can utilize an exemplary embodiment of a system to control the supplying of fuel to a gas turbine system and can be configured to implement an exemplary embodiment of a method or process to control the supplying of fuel to a gas turbine system.
Figure 2:
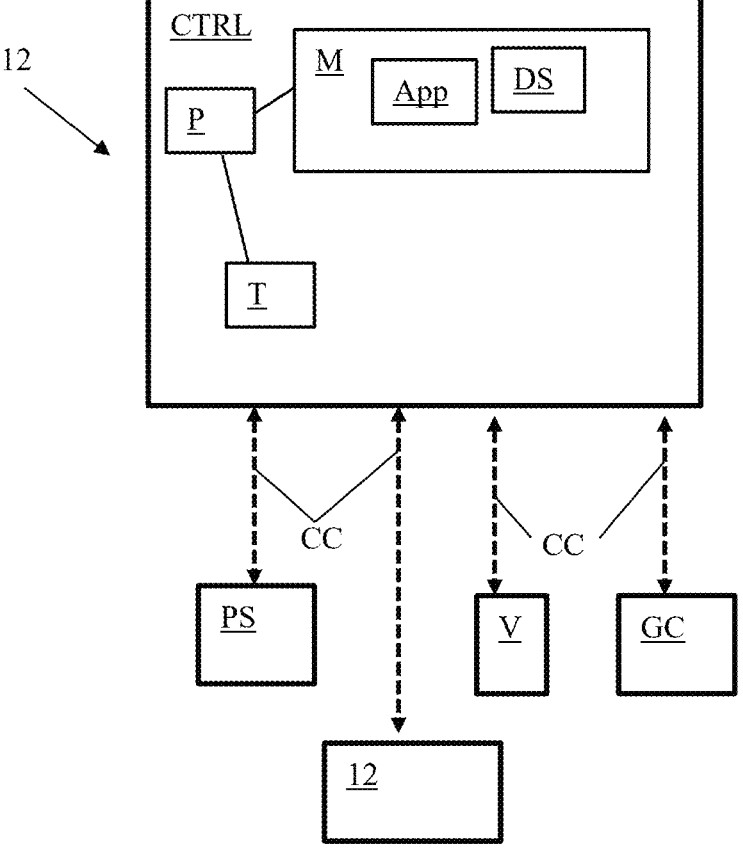
FIG. 2 is a block diagram of a first exemplary embodiment of a system to control the supplying of fuel to a gas turbine system, which can be utilized in the first exemplary embodiment of the apparatus 1 to control the supplying of fuel to a gas turbine system.
Figure 3:
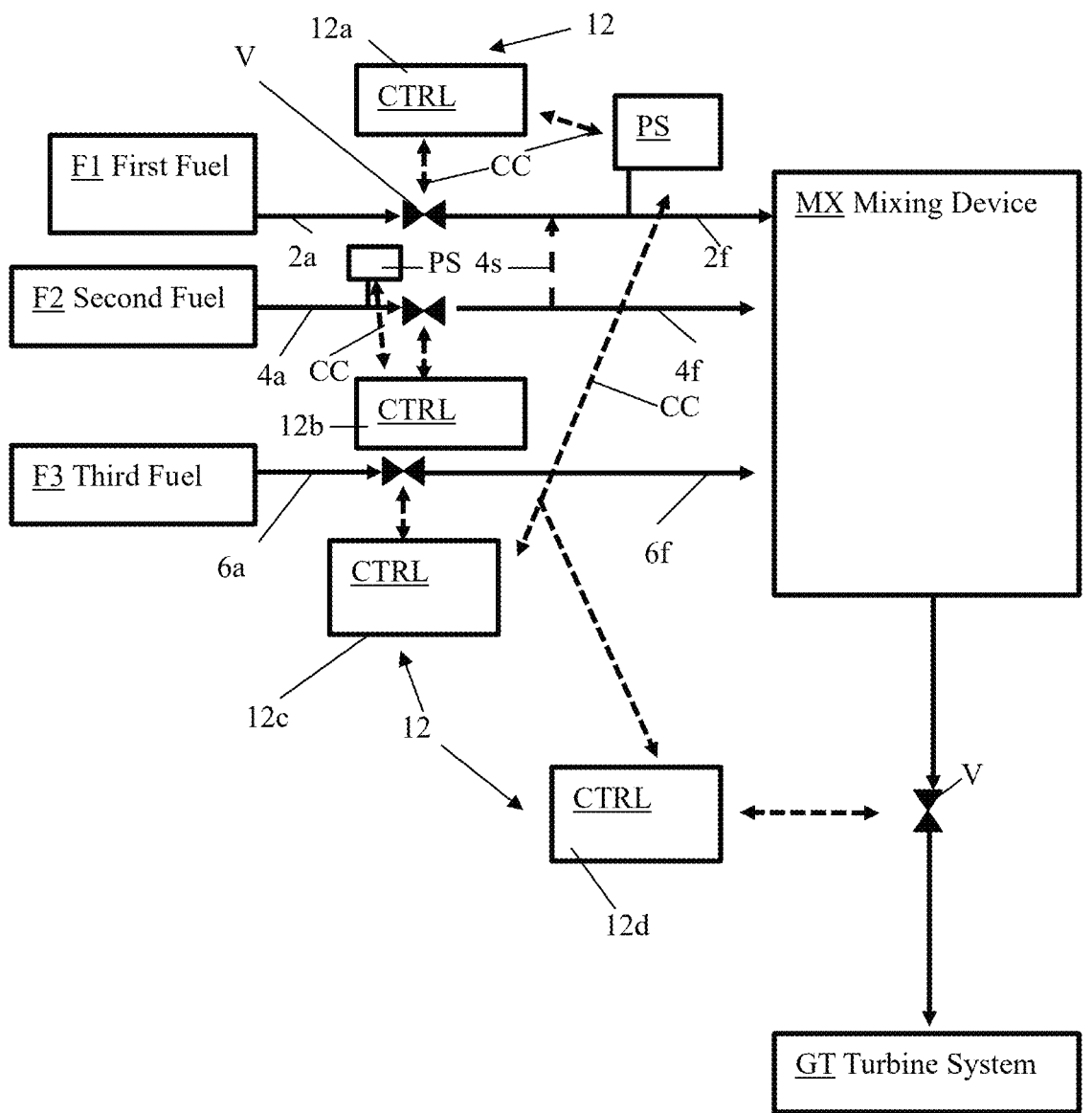
FIG. 3 is a schematic diagram of the first exemplary embodiment of the system to control the supplying of fuel to a gas turbine system, which can be utilized in the first exemplary embodiment of the apparatus 1 to control the supplying of fuel to a gas turbine system.

Referring to FIGS. 1-4, an apparatus 1 can include a plurality of fuel sources that can each be fluidly connected to a mixing device MX via a fuel conduit arrangement 3 so that a feed of fuel can be fed to a gas turbine system GT via a gas turbine system feed conduit 9 that can be positioned between the gas turbine system GT and the mixing device MX. The gas turbine system feed conduit 9 can include a feed valve V that can be adjustable to control a flow rate and/or pressure of the fuel being fed to the gas turbine system GT.

The gas turbine system GT can include a combustor that combusts the fuel to provide heat that can be utilized to generate electricity via one or more turbines. The gas turbine system GT can also include a control system that is configured to control operation of the combustor(s) and turbine(s) of the gas turbine system.

The fuel sources can include sources of multiple different fuels. For example, the fuel sources can include a source of a first fuel F1, a source of a second fuel F2, and a source of a third fuel F3. In some embodiments, there can be additional sources of fuel (e.g. a source of a fourth fuel, a source of a fifth fuel, etc.).

The source of the first fuel F1 can be a hydrogen pipeline or a hydrogen production plant that may produce hydrogen for supplying to the gas turbine system. The source of the first fuel F1 can also (or alternatively) include a storage tank of hydrogen that can be supplied with hydrogen for feeding to the gas turbine system GT. In some embodiments, the composition of the first fuel F1 can be reliably known or predicted as meeting a pre-selected compositional criteria (e.g. hydrogen fuel that is at least 99 mole percent (mol %) hydrogen, hydrogen fuel that is between 95 mol % and 100 mol % hydrogen, etc.).

The source of the second fuel F2 can be a source of refinery off-gas or other type of suitable secondary fuel. In some embodiments, the refinery off-gas can have a mixed composition of hydrocarbons and other constituents that may fall within relatively large compositional ranges. The source of the second fuel can include a refinery that may provide a flow of the refinery off-gas and/or a storage tank that may store the second fuel for feeding the fuel to the gas turbine system GT.

The source of the third fuel F3 can be a source of natural gas or other type of suitable fuel. In some embodiments, the source of the third fuel F3 can include a natural gas pipeline and/or a storage tank that can store natural gas for feeding to the gas turbine system GT. In some embodiments, the composition of the first fuel F1 can be reliably known or predicted as meeting a pre-selected compositional criteria (e.g. natural gas that is at least 99 mol % methane, natural gas that is between 95 mol % and 100 mol % methane, etc.).

The fuel conduit arrangement 3 can include a first fuel feed conduit 2 that can be positioned between the source of the first fuel F1 and the mixing device MX to feed the first fuel to the mixing device MX. The first fuel feed conduit 2 can include an upstream section 2a and a downstream section 2f that can be between the upstream section 2a and the mixing device MX.

The fuel conduit arrangement 3 can also include a second fuel feed conduit 4 that can be positioned between the source of the second fuel F2 and the mixing device MX to feed the second fuel to the mixing device MX. The second fuel feed conduit 4 can include an upstream section 4a and a downstream section 4f that can be between the upstream section 4a and the mixing device MX.

In some embodiments, the second fuel feed conduit 4 can include a merging section 4s (shown in broken line in FIG. 1) that can be positioned between the upstream section 4a of the second fuel conduit 4 and the downstream section 2f of the first fuel conduit 2 for providing the second fuel to mix with the first fuel upstream of the mixing device MX. In such an embodiment, the second fuel feed conduit 4 may not utilize a further downstream section 4f or may include a valve that can permit adjustment of the flow of the second fuel so that in some operational cycles the second fuel can be mixed with the first fuel via the merging section 4s of the second fuel conduit and other operational cycles can result in the second fuel being fed to the mixing device MX via the downstream section 4f of the second fuel conduit 4. In yet other embodiments, the merging section 4s can be provided to split the second fuel so that some of the second fuel is fed to mix with the first fuel upstream of the mixing device MX and another portion of the second fuel is fed to the mixing device MX via the downstream section 4f of the second fuel conduit 4.

Additionally, the fuel conduit arrangement 3 can include a third fuel feed conduit 6 that can be positioned between the source of the third fuel F3 and the mixing device MX to feed the third fuel to the mixing device MX. The third fuel feed conduit 6 can include an upstream section 6a and a downstream section 6f that can be between the upstream section 6a and the mixing device MX.

The fuel feed conduits of the fuel conduit arrangement 3 can be configured and arranged in conjunction with the different sources of fuel so that the fuels are providable to the gas turbine system GT at different pressures. For example, a first source of the first fuel F1 can be provided at a first pressure or first pressure range that is higher than the pressure ranges of other fuels. A second source of the second fuel F2 can be provided at a second pressure or second pressure range that is higher than the pressure ranges of other less preferred fuel sources but also lower than the first pressure or first pressure range of the source of the first fuel F1. A third source of the third fuel F3 can be provided at a third pressure or third pressure range that is higher than the pressure ranges of other less preferred fuel sources (if present) but also lower than the first pressure or first pressure range of the source of the first fuel F1. The third pressure or third pressure range can also be lower than the second pressure or second pressure range of the second source of the second fuel F2 in some embodiments such that the arrangement of the sources of fuel are provided in a cascading manner to facilitate implementation of a cascading pressure control scheme for supplying of fuel to the gas turbine system GT.

Each fuel feed conduit can also include a feed valve V, a flow sensor FS upstream of the feed valve V, a first pressure sensor PS upstream of the feed valve V and a second pressure sensor PS downstream of the feed valve V. Some fuel feed conduits can also include a fuel composition analyzer GC (e.g. a gas chromatograph, etc.) that can determine the composition of the fuel passing through the fuel feed conduit for being fed to the gas turbine system GT.

For example, the first fuel feed conduit 2 can include a first pressure sensor PS1a that is positioned upstream of a first fuel feed valve V, and a second pressure sensor PS1b that is downstream of the first fuel feed valve V. The first fuel feed conduit 2 can also include a first fuel flow sensor FS (e.g. a flowmeter, other type of flow rate measuring device, etc.). For instance, the first fuel flow sensor FS can be positioned between the first pressure sensor PS1a and the first fuel feed valve V in some embodiments. In some configurations, the upstream section 2a of the first fuel feed conduit 2 can include the pressure sensors PS, first fuel feed valve V, and the first fuel flow sensor FS.

The second fuel feed conduit 4 can include a first pressure sensor PS2a that is positioned upstream of a second fuel feed valve V, and a second pressure sensor PS2b that is downstream of the second fuel feed valve V. The second fuel feed conduit 4 can also include a second fuel flow sensor FS (e.g. a flowmeter, other type of flow rate measuring device, etc.). For instance, the second fuel flow sensor FS can be positioned between the first pressure sensor PS2a and the second fuel feed valve V in some embodiments. In some configurations, the upstream section 4a of the second fuel feed conduit 4 can include the pressure sensors PS, the second fuel feed valve V, and the second fuel flow sensor FS.

The second fuel feed conduit 4 can also include a fuel composition analyzer GC (e.g. a gas chromatograph, etc.). For instance, the upstream section 4a of the second fuel feed conduit 4 can include a fuel composition analyzer GC that is positioned upstream of the first pressure sensor PS2a such that the second pressure sensor PS2a is between the fuel composition analyzer GC and the second fuel feed valve V.

The third fuel feed conduit 6 can include a first pressure sensor PS3a that is positioned upstream of a third fuel feed valve V, and a second pressure sensor PS3b that is downstream of the third fuel feed valve V. The third fuel feed conduit 6 can also include a third fuel flow sensor FS (e.g. a flowmeter, other type of flow rate measuring device, etc.). For instance, the third fuel flow sensor FS can be positioned between the first pressure sensor PS3a and the third fuel feed valve V in some embodiments. In some configurations, the upstream section 6a of the third fuel feed conduit 6 can include the pressure sensors PS, the second fuel feed valve V, and the second fuel flow sensor FS.

The apparatus 1 can also include at least one computer device 12. Each of the computer device(s) 12 can be configured as a fuel supply system controller CTRL. Each computer device 12 can include a processor P that is communicatively connected to at least one transceiver T and a non-transitory computer readable medium M (e.g. non-transitory memory). The non-transitory computer readable medium M can have at least one application (App) stored thereon and/or at least one data store (DS) stored thereon. The non-transitory computer readable medium M can have code (e.g. code of an application, etc.) that is stored thereon that can define a method or process that is performed by the controller CTRL when the processor P runs the code, for example.

Each controller CTRL can be communicatively connected to one or more pressure sensors PS, one or more valves V (e.g. for actuation of an adjustment of the position of the valve(s) for adjusting the valve(s) between open and closed positions), and/or a fuel composition analyzer GC. Each controller CTRL can also be communicatively connected to one or more other computer devices 12 (e.g. other controller CTRL, an operator device that may be a laptop computer or workstation that runs an automated process control program, etc.).

In some configurations, there can be different controllers CTRL positioned to provide a control system for control of the flow of fuel to the mixing device MX and the gas turbine system GT. The control system can be configured as an automated control system. The control system can be configured as a distributed control system, a centralized automated control system, or other type of automated control system.

For example, there can be a first controller 12a that is positioned and configured to control the positioning of the first fuel valve V of the first fuel conduit 2. The first controller 12a can be communicatively connected to the first fuel feed valve V of the first fuel conduit 2, pressure sensors PS of the first fuel conduit 2, and the flow sensor FS of the first fuel conduit 2 via communicative connections CC between the controller CTRL and these process control elements. The first controller 12a can communicate with the first fuel feed valve V of the first fuel conduit 2 to adjust a position of the valve between its fully opened position and its fully closed position based on the sensor data it receives and/or other data it may receive from other elements (e.g. other controllers, etc.).

A second controller 12b can be positioned and configured to control the positioning of the second fuel valve V of the second fuel conduit 4. The second controller 12b can be communicatively connected to the second fuel feed valve V of the second fuel conduit 4, pressure sensors PS of the first fuel conduit 4, the fuel composition sensor GC of the second fuel conduit 4, and the flow sensor FS of the second fuel conduit 4 via communicative connections CC between the controller CTRL and these process control elements. The second controller 12*b* can communicate with the second fuel feed valve V of the second fuel conduit 4 to adjust a position of the valve between its fully opened position and its fully closed position based on the sensor data it receives and/or other data it may receive from other elements (e.g. other controllers, etc.).

A third controller 12*c* can be positioned and configured to control the positioning of the third fuel valve V of the third fuel conduit 6. The third controller 12*c* can be communicatively connected to the valve V of the third fuel conduit 6, pressure sensors PS of the third fuel conduit 6, and the flow sensor FS of the third fuel conduit 6 via communicative connections CC between the controller CTRL and these process control elements. The third controller 12*c* can communicate with the third fuel feed valve V of the third fuel conduit 6 to adjust a position of the valve between its fully opened position and its fully closed position based on the sensor data it receives and/or other data it may receive from other elements (e.g. other controllers, etc.).

In some embodiments, there can also be a fourth controller 12*d*. The fourth controller 12*d* can be positioned to control a position of the feed valve V of the gas turbine system feed conduit 9 (e.g. to adjust how open the valve is or to close the valve V, etc.). In some embodiments, the fourth controller 12*d* can be a gas turbine system controller that can also be configured to control operation of the gas turbine system GT and/or the combustion process of the gas turbine system GT. The fourth controller 12*d* can be configured to receive flow sensor data, fuel composition data, and/or other data from the different flow sensors FS, fuel composition analyzer(s) GC, pressure sensors PS and/or controllers CTRL via communicative connections CC between the controller CTRL and these process control elements. The fourth controller 12*d* can also receive other data from other sensors or other elements for use in adjustment of a position of the feed valve V of the gas turbine system feed conduit 9 to facilitate combustion of the fuel via a pre-defined combustion processing scheme for the gas turbine system GT as well.

In some embodiments, the apparatus 1 to control the supplying of fuel to a gas turbine system can be operational in different states. For instance, the apparatus can operate in a first operational mode, or normal operational mode, in which the fuel is to be supplied to the gas turbine system GT under a pre-defined set of normal operational criteria. Such criteria can include normal fuel supply options that may apply for the designed apparatus to support combustion of the fuel via the gas turbine system GT operating in at an operational capacity that it is designed to accommodate for providing a pre-selected level of power, or electricity.

The apparatus 1 can also operate in a second operational mode, or transient state operational mode. The second operational mode can be pre-defined to account for transient conditions that may arise unexpectedly while the gas turbine system is operating in its first operational mode. For example, the second operational mode can be pre-defined for operation in situations where a source of fuel is no longer available unexpectedly due to equipment failure, equipment malfunction, a tripped condition of equipment (e.g. at least one compressor) or other problem that may arise and prevent a source of fuel from being available for feeding to the gas turbine system GT.

In the multiple different operational modes, the controllers CTRL and other process control elements (e.g. pressure sensors PS, flow sensors FS, valves V, and fuel composition analyzer(s) GC) can be positioned and configured to perform different tasks or provide a pre-selected set of features. For instance, the first and second pressure sensors P1*a* and P1*b* can be configured to measure pressure upstream and downstream of the first fuel feed valve V of the first fuel conduit 2 to provide pressure measurement data to the first controller 12*a* and/or a controller CTRL of the gas turbine system GT (e.g. fourth controller 12*d*). The flow sensor FS of the first fuel conduit 2 that is upstream of the first fuel feed valve V of the first fuel conduit 2 can also provide flow measurement data to the first controller 12*a* and/or a controller CTRL of the gas turbine system GT (e.g. fourth controller 12*d*). The controller(s) can be configured to utilize this data to adjust a position of the first fuel feed valve V and/or the feed valve V of the gas turbine system feed conduit 9. For example, the first controller 12*a* can be configured to receive the pressure data and the flow measurement data to determine whether the first fuel feed valve V is to be adjusted to a more open or less open position or is to be adjusted to a fully open or a fully closed position based on the received pressure data and the flow measurement data. Such adjustment can be in accordance with a pre-defined fuel feeding criteria for supplying the first fuel to the gas turbine system GT as a most preferred fuel source for the gas turbine system GT to utilize for combustion of the fuel or mixture of fuels being fed to the gas turbine system GT via one or more of the different fuel sources.

In the event the first fuel source has an unknown fuel composition or has a fuel composition that may vary significantly, a fuel composition analyzer GC can also be provided upstream of the first fuel feed valve V for providing fuel compositional data to the first controller 12*a* and/or a controller CTRL of the gas turbine system GT (e.g. fourth controller 12*d*). Such data can also be utilized in conjunction with adjustment of a position of the first fuel feed valve V, for example. The gas turbine system GT controller can also receive that data and/or the flow measurement data and/or pressure data from the sensors of the first fuel conduit 2 to determine a heat of combustion that can be provided by the first fuel being fed to the gas turbine system via the first fuel conduit 2 for adjustment of the feed valve V of the gas turbine system feed conduit 9 and/or controlling operation of the gas turbine system GT to account for the heat input of combustion available via the feed of the first fuel (e.g. the amount of heat released during its combustion of the first fuel).

In embodiments in which the source of the first fuel F1 has a known composition or has a reliably predictable composition, the fuel composition sensor GC may not be desired or needed Instead, the compositional property and heat input of combustion that the first fuel can provide may be pre-defined at the controller(s) so that this information is known by the controller(s) CTRL based on such stored, pre-defined information to avoid the cost and maintenance requirements that may be associated with use of a fuel composition sensor GC. While use of a possibly unnecessary fuel composition sensor for the first fuel in such a situation may not be preferred, it can nevertheless also be utilized in such cases in the event having such a compositional sensor is desired for a particular embodiment.

The first and second pressure sensors P2*a* and P2*b* of the second fuel conduit 4 can be configured to measure pressure upstream and downstream of the second fuel feed valve V of the second fuel conduit 4 to provide pressure measurement data to the second controller 12*b* and/or a controller CTRL of the gas turbine system GT (e.g. fourth controller 12*d*). The flow sensor FS of the second fuel conduit 4 that is upstream of the second fuel feed valve V of the second fuel conduit 4 can also provide flow measurement data to the second controller 12*b* and/or a controller CTRL of the gas turbine system GT (e.g. fourth controller 12*d*). The controller(s) can be configured to utilize this data to adjust a position of the second fuel feed valve V and/or the feed valve V of the gas turbine system feed conduit 9.

The second controller 12*b* can be configured to receive the pressure data and the flow measurement data to determine whether the second fuel feed valve V of the second fuel conduit 4 is to be adjusted to a more open or less open position or is to be adjusted to a fully open or a fully closed position based on the received pressure data and the flow measurement data. Such adjustment can be in accordance with a pre-defined fuel feeding criteria for supplying the second fuel to the gas turbine system GT as a preferred fuel source for the gas turbine system GT to utilize for combustion of the fuel or mixture of fuels being fed to the gas turbine system GT via one or more of the different fuel sources. In some embodiments, the second fuel can be a second most preferred fuel while the first fuel is a most preferred fuel for the gas turbine system.

In the event the second fuel source has an unknown fuel composition (e.g. is a refinery off-gas, etc.) or has a fuel composition that may vary significantly, a fuel composition analyzer GC can also be provided upstream of the second fuel feed valve V for providing fuel compositional data to the second controller 12*b* and/or a controller CTRL of the gas turbine system GT (e.g. fourth controller 12*d*). Such data can also be utilized in conjunction with adjustment of a position of the second fuel feed valve V, for example. The gas turbine system GT controller CTRL can also receive that data and/or the flow measurement data and/or pressure data from the sensors of the second fuel conduit 4 to determine a heat of combustion that can be provided by the second fuel being fed to the gas turbine system GT via the second fuel conduit 4 for adjustment of the feed valve V of the gas turbine system feed conduit 9 and/or controlling operation of the gas turbine system GT to account for the heat input of combustion available via the feed of the second fuel.

In embodiments in which the source of the second fuel F2 has a known composition or has a reliably predictable composition, the fuel composition sensor GC may not be desired or needed in some instances. Instead, the compositional property and heat input of combustion the second fuel can provide may be defined so it is known by the controller(s) CTRL based on such stored pre-defined information to avoid the cost and maintenance requirements that may be associated with use of a fuel composition sensor GC. While use of a possibly unnecessary fuel composition sensor for the second fuel in such a situation may not be preferred, it can also be utilized in such cases in the event having such a compositional sensor is desired for a particular embodiment.

The first and second pressure sensors P3*a* and P3*b* of the third fuel conduit 6 can be configured to measure pressure upstream and downstream of the third fuel feed valve V of the third fuel conduit 6 to provide pressure measurement data to the third controller 12*c* and/or a controller CTRL of the gas turbine system GT (e.g. fourth controller 12*d*). The flow sensor FS of the third fuel conduit 6 that is upstream of the third fuel feed valve V of the third fuel conduit 6 can also provide flow measurement data to the third controller 12*c* and/or a controller CTRL of the gas turbine system GT (e.g. fourth controller 12*d*). The controller(s) can be configured to utilize this data to adjust a position of the third fuel feed valve V and/or the feed valve V of the gas turbine system feed conduit 9.

The third controller 12*c* can be configured to receive the pressure data and the flow measurement data to determine whether the third fuel feed valve V of the third fuel conduit 6 is to be adjusted to a more open or less open position or is to be adjusted to a fully open or a fully closed position based on the received pressure data and the flow measurement data. Such adjustment can be in accordance with a pre-defined fuel feeding criteria for supplying the third fuel to the gas turbine system GT as a preferred fuel source for the gas turbine system GT to utilize for combustion of the fuel or mixture of fuels being fed to the gas turbine system GT via one or more of the different fuel sources. In some embodiments, the third fuel can be a third most preferred fuel while the first fuel is a most preferred fuel for the gas turbine system and the second fuel is a second most preferred fuel for the gas turbine system GT.

In the event the third fuel source has an unknown fuel composition or has a fuel composition that may vary significantly, a fuel composition analyzer GC can also be provided upstream of the third fuel feed valve V for providing fuel compositional data to the third controller 12*c* and/or a controller CTRL of the gas turbine system GT (e.g. fourth controller 12*d*). Such data can also be utilized in conjunction with adjustment of a position of the third fuel feed valve V, for example. The gas turbine system GT controller CTRL can also receive that data and/or the flow measurement data and/or pressure data from the sensors of the third fuel conduit 6 to determine a heat of combustion that can be provided by the second fuel being fed to the gas turbine system GT via the third fuel conduit 6 for adjustment of the feed valve V of the gas turbine system feed conduit 9 and/or controlling operation of the gas turbine system GT to account for the heat input of combustion available via the feed of the third fuel.

In embodiments in which the source of the third fuel F3 has a known composition or has a reliably predictable composition, the fuel composition sensor GC may not be desired or needed in some instances. Instead, the compositional property and heat input of combustion the third fuel can provide may be predefined in memory of the controller CTRL so it is known by the controller(s) CTRL based on such stored pre-defined information to avoid the cost and maintenance requirements that may be associated with use of a fuel composition sensor GC. While use of a possibly unnecessary fuel composition sensor for the third fuel in such a situation may not be preferred, it can also be utilized in such cases in the event having such a compositional sensor is desired for a particular embodiment.

Embodiment of the apparatus 1 can be configured so that one or more controllers CTRL can detect a transient operational condition issue to adjust its mode of operation from a first mode to a second mode. The first mode of operation for the controller(s) CTRL can utilize adjustment parameters for adjusting one or more elements (e.g. position of valve V, etc.) based on data the controller(s) CTRL can receive from one or more sensors in accordance with a first pre-defined adjustment parameter criteria. Such a criteria for a first operational mode can define an adjustment to valve position and/or other elements in response to data indicating a flow or pressure deviation from an identified one or more set points has occurred. The adjustment parameters can be defined in the first mode for normal operation of the gas turbine system GT and apparatus 1 in which the availability of fuel is in accordance with a designed normative operation of the gas turbine system GT in which the fuel from the fuel sources is available and feedable to the gas turbine system GT for meeting a pre-selected set of combustion criteria that includes pollution control criteria, gas turbine power output level criteria, and gas turbine combustion criteria.

The second mode of operation for the controller(s) CTRL can utilize adjustment parameters for adjusting one or more elements (e.g. position of a valve V, etc.) based on data received from one or more sensors in accordance with a first pre-defined adjustment parameter criteria. Such a criteria for the second operational mode can define an adjustment to valve position and/or other elements in response to data indicating a flow or pressure deviation from an identified one or more set points has occurred. The adjustment parameters can be defined in the second mode for a transient condition operation of the gas turbine system GT and apparatus 1 in which the availability of fuel is unexpectedly different from what is expected based on the designed normative operation of the gas turbine system GT in which the fuel from the fuel sources is available and feedable to the gas turbine system GT. Each controller CTRL can be configured to detect a transient condition and, in response to such a condition begin detected, adjust one or more of its adjustment parameters for operation in the second mode, for example. The second mode can be defined for the controller(s) CTRL to facilitate the apparatus 1 being able to meet a pre-selected set of combustion criteria that includes pollution control criteria, gas turbine power output level criteria, and gas turbine combustion criteria, in response to a sudden and unexpected loss of fuel from one or more sources of fuel.

Each controller CTRL can be configured to detect a transient condition via a pre-selected transient condition detection scheme. For instance, a controller CTRL can be configured to detect a transient condition occurrence based on a pressure sensor PS indicating a significant decrease in pressure that meets or exceeds a pre-selected transient condition threshold, a flow sensor FS providing data indicating that the flow of fuel is at or below a pre-selected transient condition detection threshold, and/or receipt of data from equipment associated with a source of fuel that indicates a tripped condition of equipment that can result in a sudden and unexpected loss of fuel (e.g. fuel being unable to be provided at all or a flow of fuel being reduced below a pre-selected minimum flow level, etc.). In response to detection of a transient condition, the controller(s) CTRL can be configured to adjust one or more parameters for adjusting one or more elements (e.g. position of a valve V, etc.) based on data received from one or more sensors in accordance with a first pre-defined adjustment parameter criteria.

For example, in a first operational mode, one or more of the controllers CTRL can be configured to provide a gain signal to a fuel feed valve V to adjust a position of a fuel feed valve V based on an evaluation of the flow sensor data and/or pressure sensor data received from the flow sensor FS and/or pressure sensors PS of a fuel conduit. In response to a deviation value, the controller can output a gain value for adjustment of the valve position as an adjustment parameter for adjusting the position of the valve V based on the received sensor data. In the first operation mode, the gain value that is provided for adjustment can be at a first value to facilitate adjustment. In response to detection of a transient condition, this gain value used for adjustment based on the same sensor data as an adjustment parameter can be reduced by a pre-selected second mode adjustment value to reduce the gain value that the controller provides by a pre-selected relative amount. For example, the controller CTRL can be configured so that the gain value used as an adjustment parameter when in the second operational mode can be 25% or 50% less than the value that would be utilized when the controller CTRL operates in its first operational mode. As another example, the controller CTRL can be configured so that the gain value used as an adjustment parameter when in the second operational mode can be between 20% less and 75% less when in the second operational mode as compared to the first operational mode. As a result of such an adjustment in operational mode, the controller CTRL can provide adjustment control data (e.g. adjustment control signaling) to the fuel feed valve V and/or other elements that slows the extent and rate of change in response to the detected transient condition and failure of the flow of fuel parameters being monitored via the sensors to meet a pre-selected set point or pre-selected fuel flow and/or heat of combustion target. This slower response can be provided via the adjustment in control parameter adjustment values, which can be utilized in response to the detected transient condition and adjustment to the second operational mode.

For example, in some embodiments the first fuel F1 can be hydrogen that is provideable at a first pressure range, the second fuel F2 can be refinery off-gas that is provideable at a second pressure range and the third fuel F3 can be natural gas that is provideable at a third pressure range. the second pressure range can be lower than the first pressure range and higher than the third pressure range such that the first fuel is providable at a higher pressure and the third fuel can be provided at a lowest pressure. The apparatus 1 can be configured to deliver fuel from one or more of these sources of fuel to the gas turbine system via the mixing device MX. Each fuel can have a respective feed conduit for providing the fuel to the mixing device for mixing and subsequently outputting the fuel to the gas turbine system GT via the gas turbine feed conduit 9. The first fuel F1 can be a most preferred fuel source such that the fuel fed to the gas turbine system GT is preferably mostly hydrogen. Some or no second fuel F2 may be provided for mixing with the first fuel via the mixing device MX to provide the fuel to the gas turbine system GT. The third fuel F3 can be prevented from being fed to the mixing device MX during normal operational conditions as a less desired fuel source for the gas turbine system GT.

In response to detection of a transient condition that can affect the supply of the first fuel F1 (e.g. hydrogen) to the gas turbine system, availability of the first fuel F1 may no longer be providable or may no longer be provided at a sufficient level for meeting gas turbine system combustion demands. Such a detection of this type of transient condition can be due to a detected drop in pressure via the first pressure sensor P1a and/or second pressure sensor PS1b, a detected low flow rate of the first fuel via the flow sensor FS of the first fuel conduit 2, and/or other sensor (e.g. a pressure sensor PS that is between the first fuel feed valve V and the mixing device MX in the downstream section 2f of the first fuel conduit 2, etc.). The first controller 12a, second controller 12b, third controller 12c, and/or fourth controller 12d may each receive data to indicate detection of the transient condition for adjusting an operational mode form a first mode of operation to a second mode of operation. Alternatively, only the third controller 12c that can be configured to adjust the position of the third fuel feed valve V of the third fuel conduit 6 may receive such an indication. As yet another example, only the third controller 12c and gas turbine controller CTRL (e.g. fourth controller 12d) that can control the position of the feed valve V of the gas turbine system feed conduit 9 may respond to such a transient condition detection by adjusting their operational modes.

For example, in some embodiments, the transient condition can be detected by the third controller 12*c* and the controller CTRL can respond by adjusting its operational mode from a first mode to a second mode and subsequently communicate with the third fuel feed valve V of the third fuel conduit to initiate opening of that valve to start supplying fuel from the source of the third fuel F3 to the mixing device MX. This opening of the valve V can be delayed to facilitate reduction in pressure at the mixing device MX such that the pressure of the third fuel F3 providable via the source of the third fuel F3 is higher than the pressure downstream of the third fuel feed valve V of the third fuel conduit 6. After an initial stage in which the third fuel F3 is fed to the mixing device MX for feeding to the gas turbine system GT as a replacement for the unexpectedly lost supply of the first fuel, the third controller 12*c* can detect that the transient condition is no longer present and can adjust its operational mode back to the first operational mode for adjusting its control parameter adjustments back to an initial level so that the adjustment in flow control of the third fuel F3 can occur more quickly as compared to when the third controller 12*c* is operating in its second operational mode (e.g. the gain adjustment can be increased back to its initial state, which can be double or more than double the adjustment value as compared to the values used when the controller operates in its second operational mode). For example, in some embodiments, this adjustment in operational mode can result in the second operational mode having different adjustment control data that is between 25% and 75% lower than the values used by the controller for adjustments to be made in response to deviations from one or more setpoints that may occur when the controller operates in its second operational mode. In some embodiments, the adjustment parameters may be 50% lower or between 40% lower and 60% lower in the second operational mode as compared to the first operational mode.

According to the present disclosure, such an adjustment in operational mode for a controller can provide an enhanced transition of fuel switchovers due to transient conditions that can help avoid flame out conditions, oscillations, and other gas turbine performance problems. A surprising result of the present disclosure is that such an improved gas turbine operational performance during transient condition caused via an unexpected disruption in fuel supply can be further enhanced by the gas turbine controller CTRL also adjusting its control parameter adjustment protocols based on the detected transient condition.

For example, in addition to the third controller 12*c* adjusting its operational mode, the fourth controller 12*d* can also adjust its operational mode form a first operational mode to a second operational mode. As noted above, the fourth controller 12*d* can detect the transient condition and the controller CTRL can respond by adjusting its operational mode from a first mode to a second mode and subsequently communicate with the feed valve V of the gas turbine system feed conduit 9 that is downstream of the mixing device MX to adjust a position of that valve as well as adjusting other gas turbine operational set points for combustion of fuel to account for the lost supply of first fuel and lower fuel flow rate and lower heat of combustion input that may be provided to the gas turbine system until the third fuel F3 can be sufficiently supplied to the mixing device MX to make up for the lost supply of the first fuel.

This operational adjustment of the gas turbine system controller CTRL can work in combination with the third controller 12*c* working to control the third fuel feed valve V of the third fuel conduit 6 for feeding the third fuel to the mixing device MX. This adjustment in operational mode of the gas turbine system controller CTRL can include adjusting a control parameter used to control the magnitude in which the feed valve V of the gas turbine system feed conduit 9 is adjusted in response to deviations from at least one detected set point to help slow the responsiveness of the gas turbine system GT to the transient condition. This reduction in responsiveness can help avoid oscillations and flame out conditions from arising.

After an initial stage in which the third fuel F3 is fed to the mixing device MX for feeding to the gas turbine system GT as a replacement for the unexpectedly lost supply of the first fuel, the controller CTRL for the gas turbine system GT can detect that the transient condition is no longer present and can adjust its operational mode back to the first operational mode for adjusting its control parameter adjustments back to an initial level so that the adjustment in operation of the gas turbine system GT and/or the positioning of the feed valve V of the gas turbine system feed conduit 9 is returned to normative values used in the controller's first operational mode (e.g. the gain adjustment can be increased back to its initial state, which can be double or more than double the adjustment value as compared to the values used when the controller operates in its second operational mode). For example, in some embodiments, this adjustment in operational mode can result in the second operational mode having different adjustment control data that is between 25% and 75% of the value(s) used when the controller operates in the first operational mode for responding to deviations in one or more set points that may occur when the controller operates in its second operational mode. In some embodiments, the adjustment parameters may be 50% lower or between 40% lower and 60% lower in the second operational mode as compared to the first operational mode, for example.

It is contemplated that other embodiments can be configured so that one or more other controllers CTRL can adjust its operational mode to provide an enhanced transition of fuel switchovers due to transient conditions that can help avoid flame out conditions, oscillations, control system instability, and other gas turbine performance problems. For instance, in some embodiments, the second controller 12*b* can also adjust its operational mode in response to detection of a transient condition in a manner similar to how the third controller 12*c* adjusts its operational mode.

Also, in operational situations in which the third fuel or the second fuel may be a primary fuel source and subsequently experience a transient condition that results in lost fuel flow, the first controller 12*a* can adjust its operational mode similar to how the third controller 12*c* adjusts its operational mode.

FIG. 4 illustrates an exemplary embodiment of a method or process that can be implemented by an exemplary embodiment of the apparatus 1. For example, in a first step S1, the first fuel and/or the second fuel F2 can be fed to a mixing device MX to form a feed of fuel for feeding to the gas turbine system GT. The fuel can be provided via the gas turbine system feed conduit 9 that is positioned between the mixing device MX and the gas turbine system GT, for example.

In a second step S2, a control parameter for a third fuel feed valve V can be adjusted so that a rate of adjustment of a position of the third fuel feed valve based on a pre-defined control criteria is decreased from a normal mode of operational setting to a transient condition setting to slow the rate of adaptation for adjustment of the third fuel feed valve. Optionally, a control parameter for a feed valve V of the gas turbine system feed conduit 9 can also be adjusted so that a rate of adjustment of a position of the feed valve that can be based on a pre-defined control criteria is also decreased from a normal mode of operational setting to a transient condition setting to slow the rate of adaptation for adjustment of the feed valve V of the gas turbine system feed conduit 9. The reduction in the control parameter to slow the rate of adjustment of the valve(s) as compared to a normal operational mode can be provided to account for a fuel switchover to the third fuel F3 that can be initiated to account for lost flow of first fuel and/or second fuel due to the transient condition. In some embodiments, the adjustment can reduce the responsiveness of the controller(s) by as much as 50% or by a reduction of between 25% and 75% to counteract the strong and nonlinear interactions among the control loops to ensure stability of the control system.

In a third step S3, the feed valve for the third fuel can be adjusted to increase the flow rate of the third fuel to the gas turbine system GT. In some embodiments, the adjustment can be from no flow of the third fuel F3 to a flow rate of the third fuel that is provided to replace the loss of the first fuel F1 and/or second fuel that occurred due to the transient condition. This adjustment can occur at the same time the feed valve V of the gas turbine system feed conduit 9 is also adjusted as well as one or more other control parameters for the gas turbine system GT to account for the reduced flow of fuel for addressing the transient condition while also minimizing or avoiding flame out and oscillations via combustion of the fuel being fed to the gas turbine system GT. The adjustment in the feeding of the third fuel F3 to the gas turbine system GT can be in accordance with the adjusted control parameters that are adjusted in the second step such that this type of flow adjustment occurs more slowly than would occur in a normal operational mode due to the adjusted control parameter(s) slowing the responsiveness that may occur as a result of detected flow variances that may vary from one or more set-points or other control conditions that can occur due to the transient issue that results in the unexpected loss of the first fuel F1.

In a fourth step S4, after a transient period of fuel switchover has elapsed (e.g. the switchover to the third fuel F3 has progressed to a more advanced pre-selected stage), the control parameter(s) of for the third fuel feed valve V of the third fuel conduit 6 and (if adjusted) the control parameter for a gas turbine system feed valve V of the gas turbine system feed conduit 9 can be returned back to its non-transient fuel switchover pre-defined value(s) for returning to the normal operational mode (e.g. by increasing the adjusted parameter(s) back to their original values for normal operation). In some embodiments, the detection of the advanced stage in the fuel switchover can be based on a time period that may have elapsed since the transient condition was detected and/or can be based on a flow rate and/or pressure of fuel being fed to the mixing device MX.

Embodiments of the method or process can also include other steps. For example, other controller parameters for other fuel conduits can be made. As another example, other sensor data can be provided to one or more controllers for detection of a particular condition or for use in determining how to adjust a valve position or operation of the gas turbine system GT.

As yet another example, the third step S3 can be also include waiting to fee the third fuel F3 to the gas turbine system GT until after pressure has decreased to a pre-selected third fuel feed pressure range. This type of processing can occur in a situation where the third fuel F3 is available at a pressure that is lower than the pressure at which the first fuel F1 and/or the second fuel F2 is available for feeding to the gas turbine system GT.

Embodiments of the method or process can be provided such that different fuels are providable to the gas turbine system GT based on a pre-selected set of control criteria and/or based on a pre-defined preference value and an availability of fuels for providing the gas turbine system GT. Also, it should be appreciated that the volumes for the different fuel conduits and the mixing device MX can be sized to account for the different flow rates of different fuels that may be needed to provide a pre-selected amount of combustion heat input to the gas turbine system via the different sources of fuel. For instance, an amount of volume of natural gas that may be needed to be fed to the gas turbine system can be much greater than a volume of hydrogen gas that may be needed to be fed to the gas turbine system to provide the same type of heat input of combustion input to the gas turbine system and the mixing device MX and conduits of the conduit arrangement 2 can be sized to account for such volumetric differences. Also, the flow rate and gas compositional data can be provided to the gas turbine system controller CTRL to facilitate the adjustment in operation of the gas turbine system GT to account for the fuel being provided to the gas turbine system via the mixing device MX and the heat input of combustion that may be provided by that fuel.

As yet another example, embodiments of the apparatus 1 and method or process can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.). It should be appreciated that embodiments can utilize a distributed control system (DCS) for implementation of one or more processes and/or controlling operations of an apparatus or method or process as well.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a process, an apparatus, a system, and methods of making and using the same have been shown and described above, it is to be distinctly understood that the invention is not limited thereto but may be otherwise variously embodied and practiced within the scope of the following claims.

What is claimed is:

1. A method to control supplying of fuel to a gas turbine system, the method comprising:

feeding fuel to a gas turbine system that includes a first fuel for a pre-defined normal operation of the gas turbine system, the first fuel passable from a source of the first fuel to a mixing device via a first fuel conduit for being fed to the gas turbine system, the fuel being fed to the gas turbine system for the pre-defined normal operation of the gas turbine system including only the first fuel or a combination of the first fuel and a second fuel that is also fed to the mixing device for being fed to the gas turbine system;

detecting a transient condition that results in a flow of the first fuel ceasing or being supplied at a flow rate below a minimum flow rate needed for operation of the gas turbine system;

adjusting a control parameter for a feed valve of a third fuel conduit, in response to detecting the transient condition, that connects a source of a third fuel to the mixing device for feeding the third fuel to the gas turbine system so that a rate of adjustment of a position of the feed valve of the third fuel conduit is reduced for a transient condition time period; and controlling the feed valve of the third fuel conduit to feed the third fuel from the source of the third fuel to the gas turbine system based on the adjusted control parameter for the feed valve of the third fuel conduit to supply the third fuel to the gas turbine system to account for the loss of the first fuel that resulted in the detected transient condition so that the gas turbine system combusts the third fuel and avoids a flame out condition.

2. The method of claim 1, further comprising:

detecting an end to the transient condition time period based on operation of the gas turbine system and the feeding of the third fuel to the gas turbine system; and adjusting the control parameter for the feed valve of the third fuel conduit, in response to detecting the end of the transient condition time period, to adjust it to a normal operational mode setting so that the rate of adjustment of the position of the feed valve of the third fuel conduit is increased to a pre-selected value for a pre-defined normal operation.

3. The method of claim 1, further comprising:

adjusting a control parameter for a feed valve of a gas turbine system feed conduit that is connected between the gas turbine system and the mixing device for feeding the fuel from the mixing device to the gas turbine system, in response to detecting the transient condition, so that a rate of adjustment of a position of the feed valve of the gas turbine system feed conduit is reduced for the transient condition time period; and controlling the feed valve of the gas turbine system feed conduit to feed the fuel that includes the third fuel output from the mixing device to the gas turbine system based on the adjusted control parameter for the feed valve of the gas turbine system feed conduit to supply the third fuel to the gas turbine system to account for the loss of the first fuel that resulted in the detected transient condition so that the gas turbine system combusts the third fuel and avoids a flame out condition.

4. The method of claim 3, wherein a controller of the gas turbine system also adjusts operation of the gas turbine system in response to detection of the transient condition.

5. The method of claim 1, further comprising:

adjusting operation of the gas turbine system in response to detection of the transient condition.

6. The method of claim 1, wherein the first fuel comprises hydrogen and the third fuel comprises natural gas and wherein a pressure of the source of the first fuel is greater than a pressure of the source of the third fuel.

7. The method of claim 6, wherein the second fuel comprises a refinery off-gas.

8. The method of claim 6, further comprising:

initiating feeding of the third fuel to the mixing device after a pressure has reduced to a pressure at the mixing device is below a pressure of the source of the third fuel, wherein the feeding of the third fuel to the mixing device is initiated after detecting the transient condition.

9. The method of claim 1, wherein the control parameter for a feed valve of a third fuel conduit is a gain value for a controller of the feed valve of the third fuel conduit.

10. The method of claim 9, wherein the adjusting of the control parameter for the feed valve of the third fuel conduit is a reduction of the gain value of between a 25% reduction and a 75% reduction.

11. The method of claim 1, further comprising:

operating the gas turbine system for combustion of the third fuel during the transient condition time period to avoid a flame out condition and avoid oscillation.

12. The method of claim 1, wherein the transient condition is a trip of a compressor of the source of the first fuel that prevents the first fuel from being feedable to the gas turbine system.

13. The method of claim 1, wherein the transient condition is due to an equipment failure that prevents the first fuel from being feedable to the gas turbine system.

14. The method of claim 1, wherein the detecting of the transient condition includes determining a loss of flow of the first fuel that exceeds a pre-selected transient condition threshold based on data from a flow sensor of a first fuel conduit and/or a pressure sensor of the first fuel conduit.

15. A system for an apparatus for supplying fuel to a gas turbine system comprising:

a controller having a processor connected to a non-transitory computer readable medium, the controller positioned to control a fuel valve of a fuel conduit connected between a source of fuel and a mixing device for feeding the fuel to a gas turbine system;

wherein the controller is configured to detect a transient condition that results in a flow of another fuel ceasing or being supplied at a flow rate below a minimum flow rate needed for operation of the gas turbine system and, in response to detecting the transient condition, adjusting a control parameter for the feed valve of the fuel conduit so that a rate of adjustment of a position of the feed valve is reduced for a transient condition time period; and wherein the controller is configured to control the feed valve based on the adjusted control parameter to supply the fuel to the gas turbine system to account for the loss of the other fuel that resulted in the detected transient condition so that the gas turbine system avoids a flame out condition.

* * * * *